(12) United States Patent
Terafuji

(10) Patent No.: US 12,026,415 B2
(45) Date of Patent: Jul. 2, 2024

(54) PRINTER AND NON-TRANSITORY COMPUTER READABLE STORAGE MEDIUM FOR PERFORMING A PRINTING PROCESS WITHOUT RECEIVING A PRINT INSTRUCTION

(71) Applicant: BROTHER KOGYO KABUSHIKI KAISHA, Nagoya (JP)

(72) Inventor: Ryo Terafuji, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/348,283

(22) Filed: Jul. 6, 2023

(65) Prior Publication Data

US 2024/0012597 A1    Jan. 11, 2024

(30) Foreign Application Priority Data

Jul. 11, 2022  (JP) .................................. 2022-111458

(51) Int. Cl.
  *G06F 3/12*  (2006.01)
(52) U.S. Cl.
  CPC .......... *G06F 3/1267* (2013.01); *G06F 3/1204* (2013.01); *G06F 3/1236* (2013.01); *G06F 3/1292* (2013.01)
(58) Field of Classification Search
  None
  See application file for complete search history.

(56) References Cited

U.S. PATENT DOCUMENTS

| | | | |
|---|---|---|---|
| 2016/0239244 A1 | 8/2016 | Kanakubo | |
| 2018/0304646 A1* | 10/2018 | Oikawa | G08C 17/02 |
| 2019/0387117 A1* | 12/2019 | Nishida | G06F 3/1236 |
| 2020/0097227 A1* | 3/2020 | Yasui | G06F 3/1256 |
| 2022/0021781 A1* | 1/2022 | Iwasaki | G06F 3/1222 |

FOREIGN PATENT DOCUMENTS

| | | |
|---|---|---|
| JP | 2016-151950 A | 8/2016 |
| JP | 2018-55307 A | 4/2018 |

\* cited by examiner

*Primary Examiner* — Thomas D Lee
(74) *Attorney, Agent, or Firm* — KENEALY VAIDYA LLP

(57) ABSTRACT

A printer includes a wireless communication controller, a memory configured to store first terminal information, in which the first information terminal wirelessly connected to the printer, a printing unit, and a controller configured to perform packet output processing of periodically outputting a first packet, packet acquisition processing of acquiring a second packet, the second packet including second terminal information of a second information terminal that receives the first packet, information determination processing of determining whether the second terminal information is the first terminal information stored in the memory, request processing of making a request for the print data from the second information terminal in a case where it is determined that the second terminal information is the first terminal information, and printing processing of causing the printing unit to print the print data obtained from the second information terminal in response to the request.

11 Claims, 7 Drawing Sheets

PRINTER AND NON-TRANSITORY COMPUTER READABLE STORAGE MEDIUM FOR PERFORMING A PRINTING PROCESS WITHOUT RECEIVING A PRINT INSTRUCTION

REFERENCE TO RELATED APPLICATIONS

This application claims priority from Japanese Patent Application No. 2022-111458 filed on Jul. 11, 2022. The entire content of the priority application is incorporated herein by reference.

BACKGROUND ART

The related art, for example, discloses a label creation system capable of performing a reservation operation, using a portable information terminal, for creating a printing label in a label creation device. In the label creation system, in a case where the portable information terminal reaches a predetermined distance range from a specific place, printing data stored in a memory by reservation is automatically transmitted to the label creation device, and a printing label is created.

DESCRIPTION

Since printing can be performed from any information terminal as long as a distance to a printing device is short, there is a concern that a printing label may be created by a label creation device different from an intention of the user.

An object of the present disclosure is to provide a technique capable of obtaining a printed matter intended by a user without issuing a print instruction again from an information terminal in a case where the information terminal and a printing device are within a wireless communication range.

In the present disclosure, a printer includes a wireless communication controller, a memory configured to store first terminal information, in which the first information terminal wirelessly connected to the printer, a printing unit, and a controller configured to perform packet output processing of periodically outputting a first packet, packet acquisition processing of acquiring a second packet, the second packet including second terminal information of a second information terminal that receives the first packet, information determination processing of determining whether the second terminal information is the first terminal information stored in the memory, request processing of making a request for the print data from the second information terminal in a case where it is determined that the second terminal information is the first terminal information, and printing processing of causing the printing unit to print the print data obtained from the second information terminal in response to the request.

In the present disclosure, a non-transitory computer readable storage medium storing an information processing program used in an information terminal. The information terminal including a computing part, an operation unit, a memory, a wireless communication controller, and a display unit. The information processing program includes instructions which, when executed by the computing part, cause the computing part to perform storage processing of storing print data in the memory, packet acquisition processing of acquiring a packet from the printer, information output processing of outputting terminal information of the information terminal, according to the packet acquired in the packet acquisition processing, request acquisition processing of acquiring a print data request from the printer, and data output processing of outputting the print data stored in the memory, in a case where the print data is stored in the memory.

According to the present disclosure, in a case where the information terminal and the printer are within the wireless communication range, the printed matter intended by the user can be obtained.

Hereinafter, embodiments of the present disclosure will be described with reference to the drawings.

<Overall Configuration of System>

Figure 1:
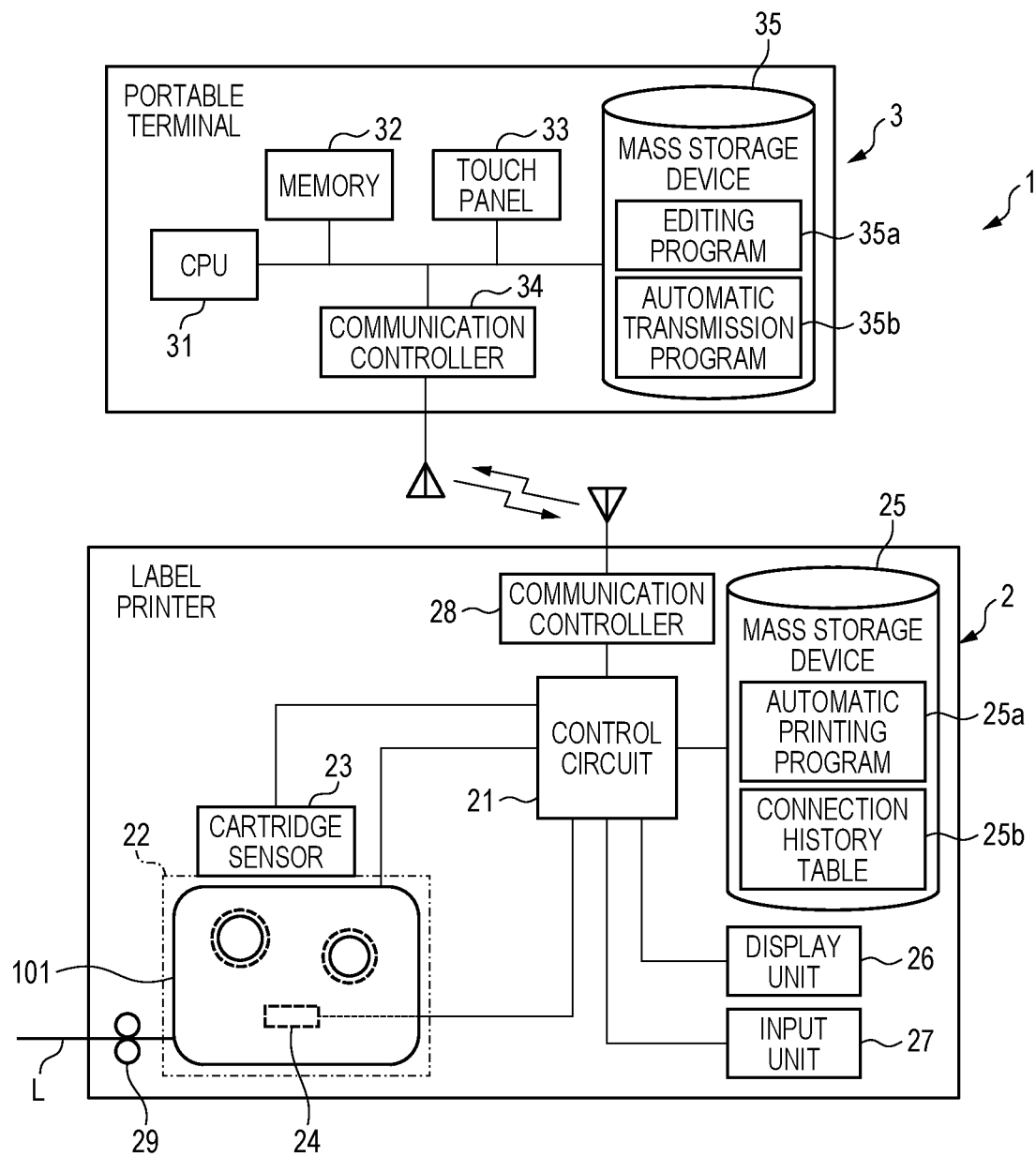
FIG. 1 is a functional block diagram illustrating a functional configuration of an entire printing system including a label printer and a portable terminal.

FIG. 1 illustrates an overall configuration of a printing system including a label printer. In FIG. 1, a printing system 1 includes, for example, a label printer 2 and a portable terminal 3 configured by a smartphone. The portable terminal 3 is connected to the label printer 2 to be configured to transmit and receive information to and from each other. In the illustrated example, the portable terminal 3 is connected via wireless communication. In the present embodiment, the wireless communication is a communication method conforming to a standard of Bluetooth Low Energy (hereinafter, abbreviated as "BLE"). "Bluetooth Low Energy" is a registered trademark of Bluetooth SIG, Inc. The label printer 2 is configured to print print data created by an operation of a user on the portable terminal 3 to create a printing label L. The portable terminal 3 is not limited to the above-mentioned smartphone, and may be a tablet terminal or the like.

<Portable Terminal>

As illustrated in FIG. 1, the portable terminal 3 includes a CPU 31, a memory 32 including, for example, a RAM and a ROM, a touch panel 33 serving as both an operation unit and a display unit, a communication controller 34, and a mass storage device 35.

The touch panel 33 is configured by integrally combining, for example, a transmissive touch pad through which a user input an instruction, information, and the like, and, for example, a liquid crystal display configured to display various types of information and messages. In this example, the communication controller 34 is configured to control transmission and reception of signals to and from the label printer 2 via BLE communication.

The mass storage device 35 is configured to store various types of programs and information. The CPU 31 is configured to execute various processing, and transmission and reception of various signals to and from the label printer 2, in accordance with the programs stored in advance in the ROM or the mass storage device 35 while using a temporary storage function of the RAM. In this example, various programs such as an editing program 35a and an automatic transmission program 35b to be described later, and print data created and transmitted by the programs are stored in advance in the memory 32 or the mass storage device 35.

The portable terminal 3 is an example of an information terminal. The CPU 31 is an example of a computing part. The touch panel 33 is an example of an operation unit and a display unit of the information terminal. The memory 32 and the mass storage device 35 are examples of a storage unit of the information terminal. The communication controller 34 is an example of a wireless communication unit of the information terminal. The automatic transmission program 35b is an example of an information processing program.

<Label Printer>

As illustrated in the drawing, the label printer 2 includes a control circuit 21, a cartridge holder 22 to and from which a cartridge 101 can be attached and detached, a cartridge sensor 23, a print head 24, a mass storage device 25, a display unit 26, an input unit 27, a communication controller 28, and a conveyance roller 29.

In the mass storage device 25, various programs such as an automatic printing program 25a to be described later, a connection history table 25b configured to record identification information of the portable terminal 3 wirelessly connected to the label printer 2 in the past, and information such as print data are stored in advance. The control circuit 21 is configured to execute various processing in the label printer 2, in accordance with the programs stored in advance in the ROM or the mass storage device 25 while using the temporary storage function of the RAM.

The display unit 26 includes, for example, a liquid crystal display configured to display various types of information to the user. The display unit 26 is configured to display a printing content. The input unit 27 includes, for example, a hard switch configured to be manually operated by the user. Each of the display unit 26 and the input unit 27 may be configured by a touch panel in which a liquid crystal display and a touch pad are integrally combined.

The cartridge holder 22 is configured such that the cartridge 101 can be attached and detached to and from the cartridge holder 22. The cartridge sensor 23 is a sensor configured to read cartridge information recorded in the mounted cartridge 101 itself by a mechanical or electrical configuration. Although not particularly illustrated, the cartridge 101 includes, inside the cartridge, a strip-shaped base tape having a specific tape width, a colorless and transparent strip-shaped cover film having the same tape width as the base tape, and an ink ribbon of a specific color.

The control circuit 21 is configured to read specification information of the cartridge 101 being mounted via the above-mentioned cartridge sensor 23, and configured to acquire information of the tape width of the base tape included in the cartridge 101, based on the read specification information. Further, the control circuit 21 is configured to mechanically control a motor for driving a drive mechanism including the conveyance roller 29 and configured to electrically control the print head 24 to form, on the cover film, a printing based on predetermined print data with a color of the ink ribbon as a printing color. The cover film is attached to the base tape and cut into an appropriate length to create a printing label L. The above-mentioned print data in the example of the present embodiment is generated based on a printing content edited by an editing work in the editing program 35a described above.

The label printer 2 described above is an example of a printer. The control circuit 21 described above is an example of a controller. The mass storage device 25 described above is an example of a storage unit of the printer. The print head 24 and the conveyance roller 29 described above are examples of a printing unit. The communication controller 28 described above is an example of a wireless communication unit of the printer. The base tape and the cover film described above are examples of a printing medium. The cartridge 101 described above is an example of a medium cartridge. The cartridge holder 22 described above is an example of a mounting unit. Cartridge specification information including the tape width of the base tape and the printing color of the ink ribbon is an example of a medium type, medium information, and cartridge information.

<Automatic Printing Reservation Function in Printing System>

Figure 2:
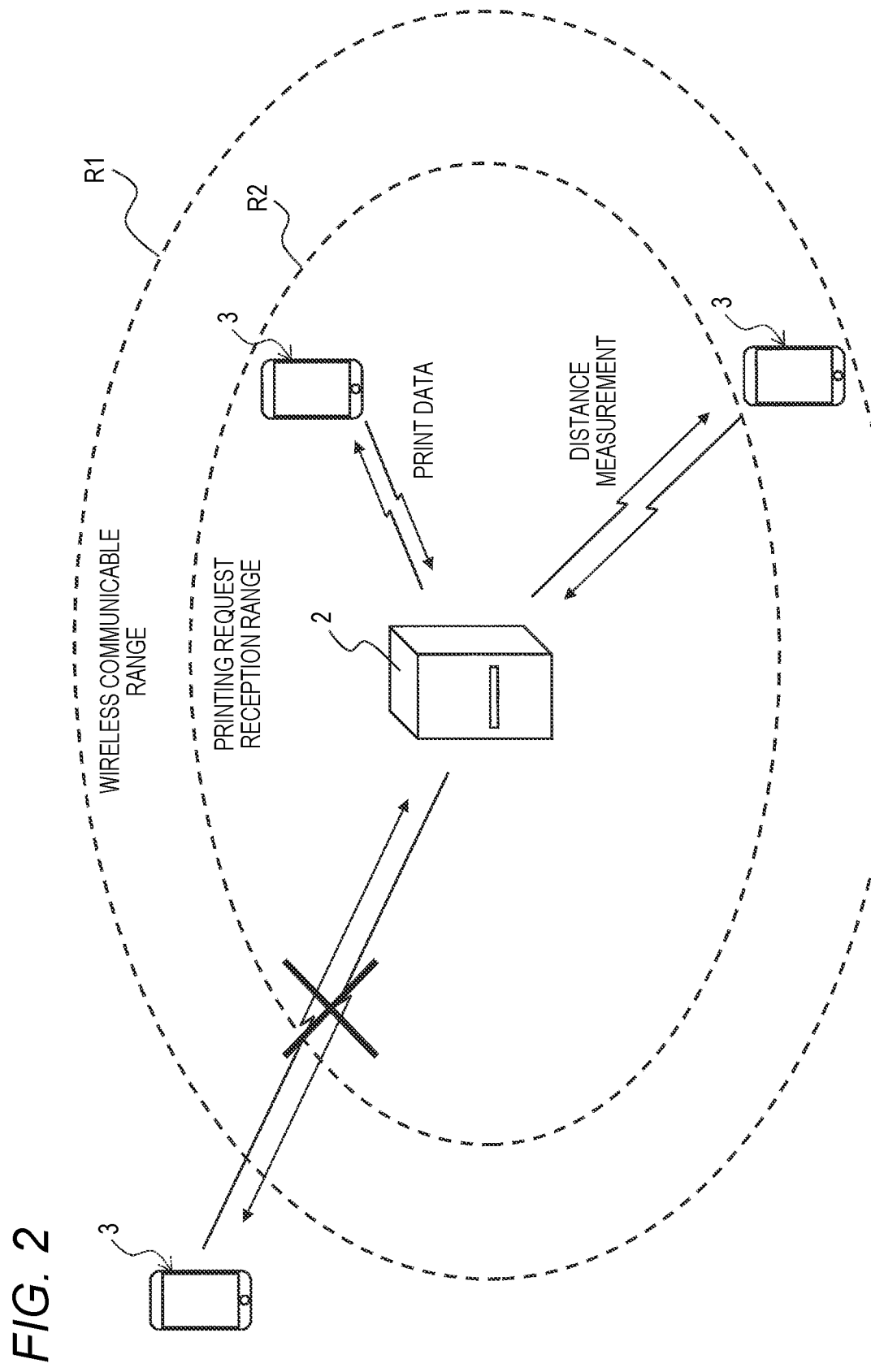
FIG. 2 is a diagram illustrating a positional relation between two communication ranges and the portable terminal in an automatic printing reservation function of the printing system.

An automatic printing reservation function in the printing system 1 of the present embodiment will be described. First, as illustrated in FIG. 2, the label printer 2 is fixedly installed in a predetermined place such as a workplace or home of the user. The portable terminal 3 is normally possessed by the user and is carried by the user at the workplace or also at a visiting destination away from home.

Under such a use condition, the user may create print data by the editing program 35a of the portable terminal 3 at a visiting destination outside a wireless communicable range R1 of the label printer 2. The automatic printing reservation function of the present embodiment is a function, with respect to print data created in advance at the visiting destination, of automatically transmitting the print data to the label printer 2 in a case where the portable terminal 3 sufficiently approaches the label printer 2, and of making a reservation to create a corresponding printing label L.

In particular, in the present embodiment, as illustrated in FIG. 2, in the label printer 2, a printing request reception range R2 having a shorter and a narrower communication distance is set within the wireless communicable range R1, which is a range allowing physical wireless communication. The label printer 2 is configured to automatically receive print data only from the portable terminal 3 existing within the printing request reception range R2. In this case, by setting the printing request reception range R2 in a spatial area such as a workplace or a room of home where only the user and the portable terminal 3 of the user are allowed to enter, it is possible to avoid reception of print data from a portable terminal 3 of an unrelated another person.

Further, in the present embodiment, the label printer 2 is configured to receive the print data only from a portable terminal 3 authenticated based on BD address information that is individual identification information of the portable terminal 3. Specifically, in a case where the portable terminal 3 has been wirelessly connected and has performed printing with the label printer 2 in the past, the print data is automatically received and printed. For example, it is possible to avoid automatic printing even in a case where a portable terminal 3 of another person is within the printing request reception range R2, such as when there is a visitor.

<Specific Steps of Automatic Printing Reservation Function>

Hereinafter, specific steps of the automatic printing reservation function of the present embodiment will be described with reference to FIGS. 3 to 6. Sequences of the automatic printing reservation function illustrated in FIGS. 4A, 4B, and 5 are performed by the automatic printing program 25a of the label printer 2 and the automatic transmission program 35b of the portable terminal 3 in cooperation with each other.

Figure 3:
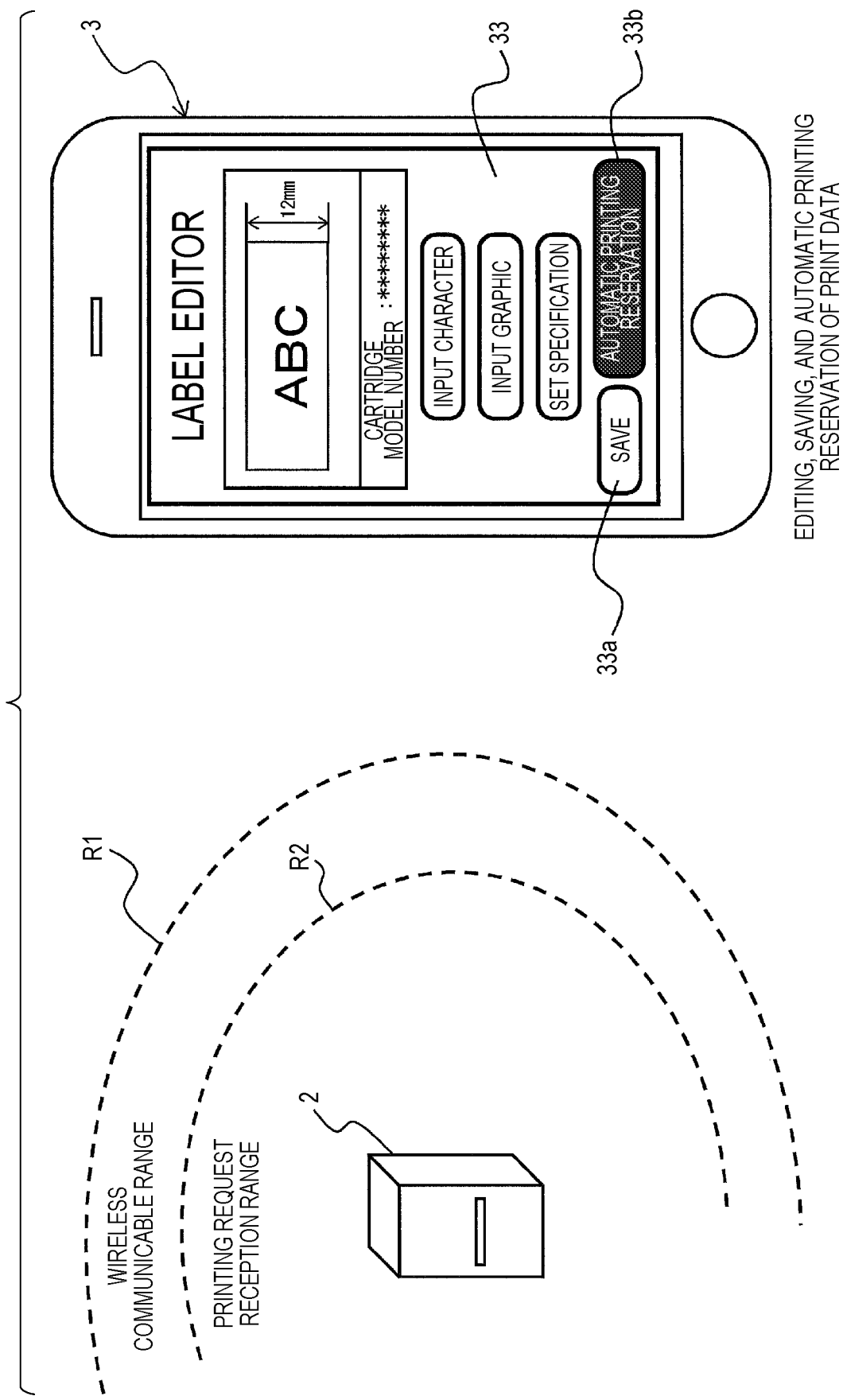
FIG. 3 is a diagram illustrating creation of print data and automatic printing reservation in the portable terminal outside a wireless communicable range.

In advance, the user edits the print data of the printing label L by operating the editing program 35a ("label editor" in the drawing) of the portable terminal 3 outside a range of the wireless communicable range R1 of the label printer 2 such as at a visiting destination. FIG. 3 illustrates an example of an edit screen of the portable terminal 3. The edit screen includes an edit area (an area including a text object "ABC" in the example of FIG. 3) of an object of the print data, a medium selection area for selecting a type of a medium on which the print data is printed, the medium selection area being a setting area for making settings necessary for printing the print data (in the example of FIG. 3, a medium having a tape width of 12 mm, a white tape as a medium color, and black as a printing color is selected), and a save area for saving the edited print data. The save area includes a save button 33a and an automatic printing reservation button 33b. In a case where an editing operation is finished, the user optionally selects whether to simply save the print data by pressing the save button 33a or to save the print data and further perform the automatic printing reservation of the print data by pressing the automatic printing reservation button 33b. For example, in a case where the editing is still being performed, the user can press the save button 33a to save the print data for continuing the editing later. In addition, in a case where the editing is completed but the label printer 2 is not wirelessly connected, the automatic printing reservation button 33b is pressed to establish wireless connection with the label printer 2, so that the saved print data can be automatically printed. In a case where the save button 33a or the automatic printing reservation button 33b is operated, the print data edited in the edit area, setting information set by the setting area, and information for distinguishing whether a storage instruction is performed by any operation of the save button 33a or the automatic printing reservation button 33b are stored in a predetermined area of the mass storage device 35 of the portable terminal 3.

Figure 4A:
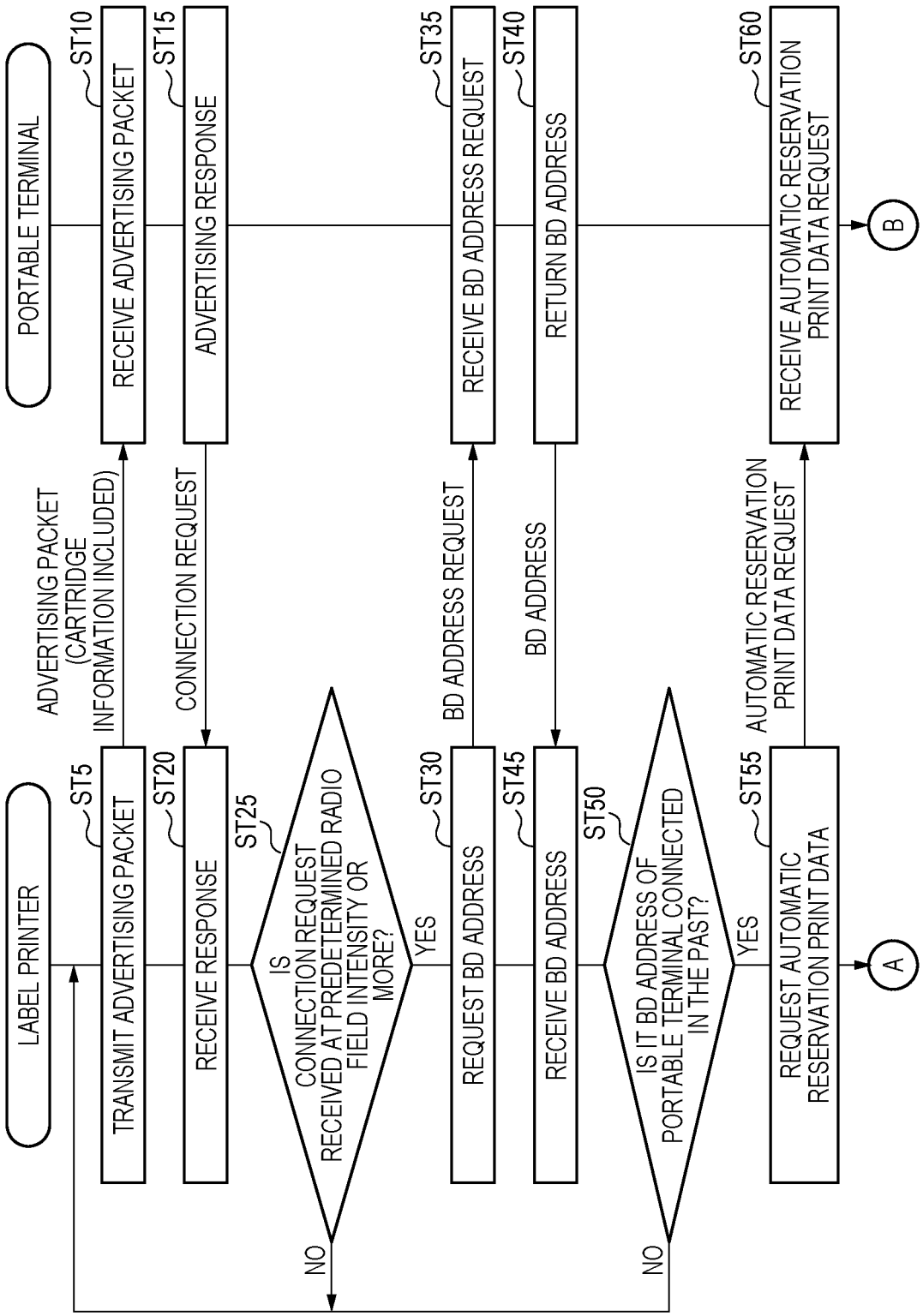
FIG. 4A is a sequence chart illustrating an example of a control procedure executed by a CPU and a control circuit.
Figure 4B:
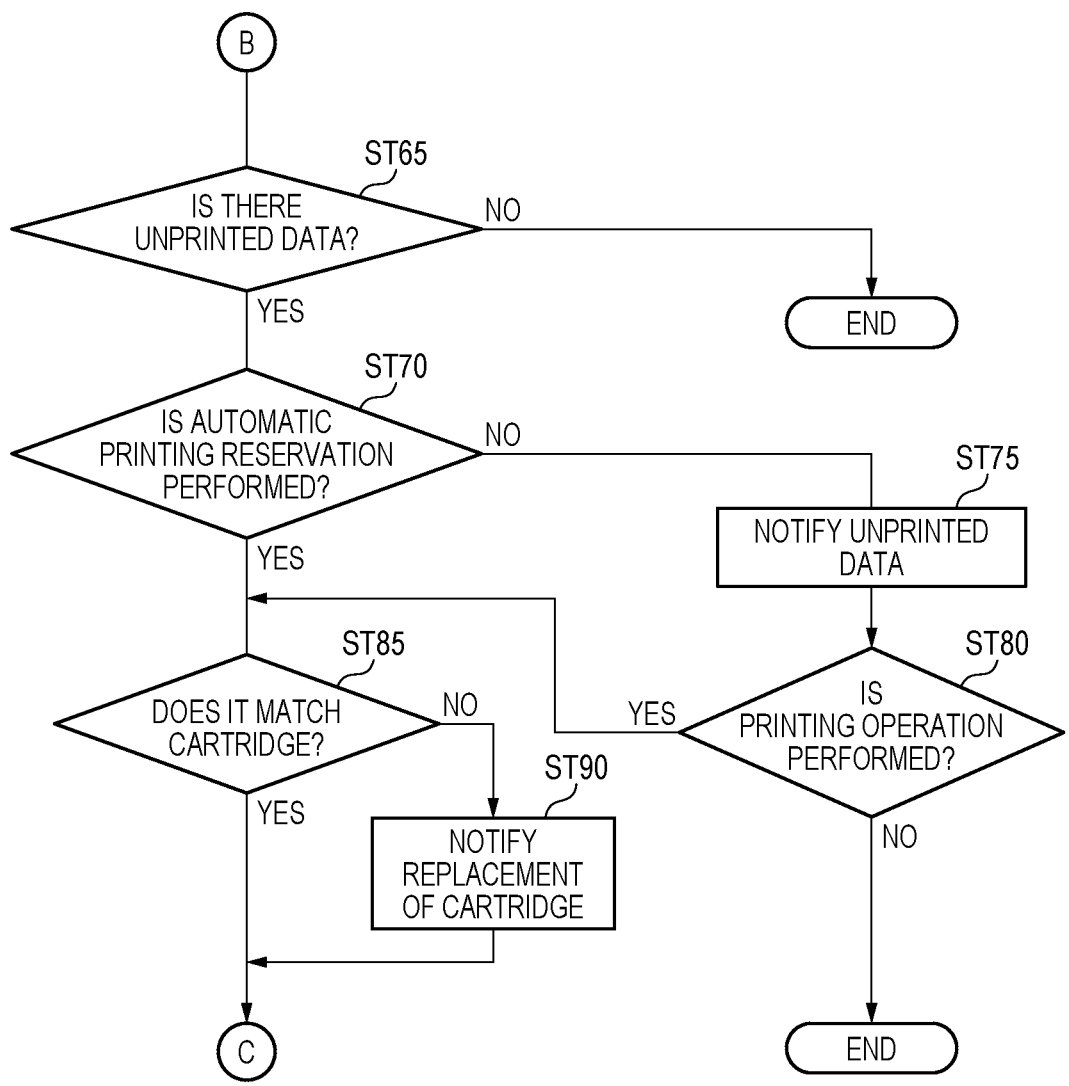
FIG. 4B is the sequence chart illustrating the example of the control procedure executed by the CPU and the control circuit.
Figure 5:
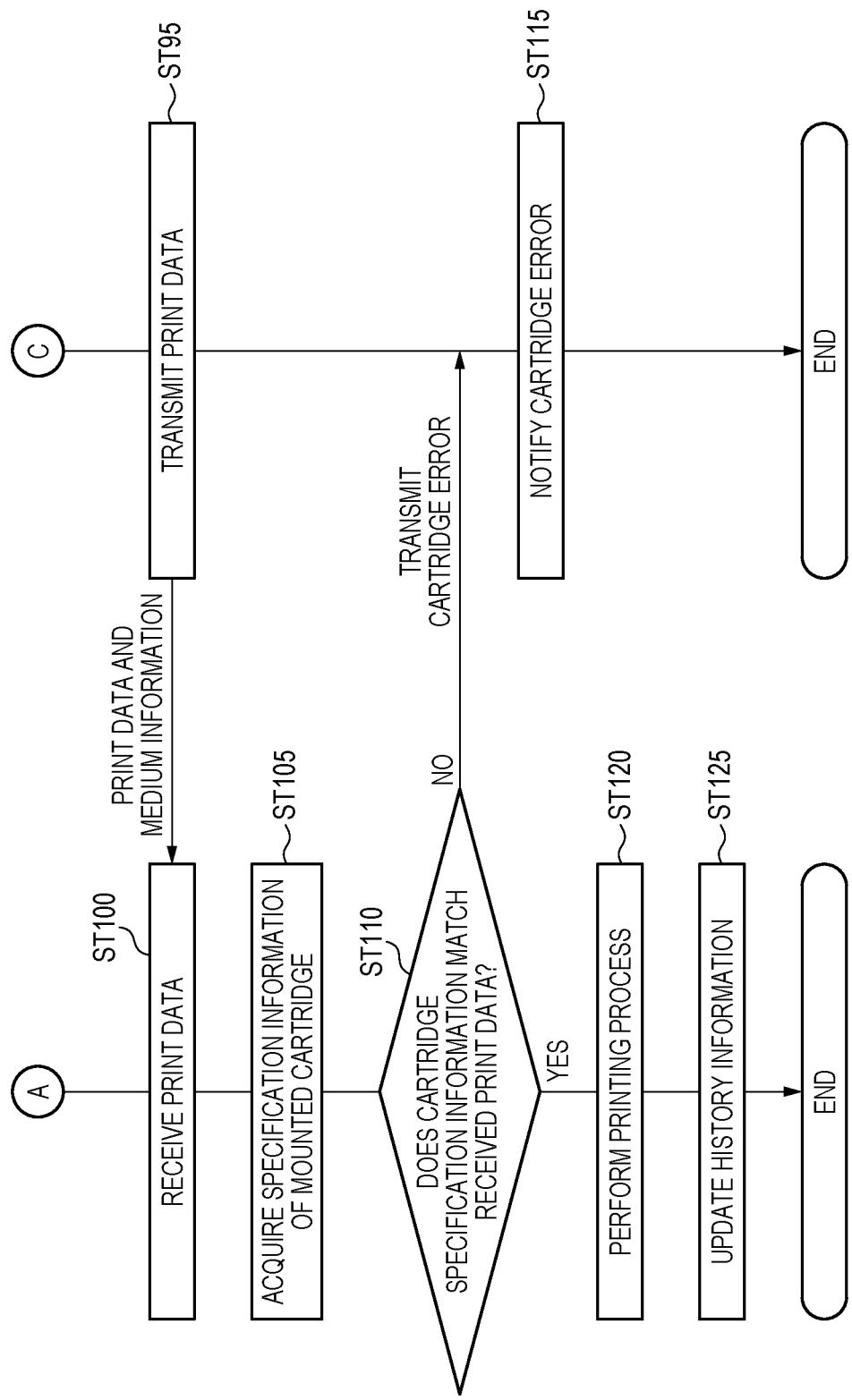
FIG. 5 is a sequence chart illustrating an example of a control procedure executed by the CPU and the control circuit.

The control circuit of the label printer 2 is configured to execute the automatic printing program 25a to perform each processing, in FIGS. 4A, 4B, and 5, of the label printer 2. In addition, the CPU of the portable terminal 3 is configured to execute the automatic transmission program 35b to perform each processing, in FIGS. 4A, 4B, and 5, of the portable terminal. In step ST5, regardless of whether the portable terminal 3 is within the printing request reception range R2 or whether the portable terminal 3 stores automatic reservation print data, the label printer 2 serves as a peripheral in a BLE communication standard and is configured to periodically transmit an advertising packet to all the portable terminals 3 existing within the wireless communicable range R1 by broadcasting. The advertising packet is an example of a first packet. The advertising packet includes cartridge information for specifying a type of the cartridge 101 mounted in the cartridge holder 22 of the label printer 2, in addition to information for specifying the label printer 2.

The label printer 2 is configured to periodically perform the advertising, and the portable terminal 3 entered within the wireless communicable range R1 receives the advertising packet in step ST10. Upon receiving the advertising packet, the portable terminal 3 is configured to store, in the memory 32, the cartridge information included in the advertising packet. Further, in step ST15, a connection request is transmitted to the label printer 2 by an advertising response as a central. A procedure of acquiring the cartridge information included in the advertising packet is an example of an information acquisition processing.

Next, the label printer 2 is configured to receive the above-mentioned connection request in step ST20. The label printer 2 is configured to determine, in step ST25, whether the connection request is received at a predetermined radio field intensity or more. In other words, the label printer 2 is configured to determine, in step ST25, whether there is a portable terminal 3 existing within the printing request reception range R2. In a case where the connection request having the predetermined radio field intensity or more is not received, a NO determination is made, and the processing returns to step ST5. In other words, in a case where the portable terminal 3 does not exist within the printing request reception range R2, a NO determination is made, and the processing returns to step ST5. On the other hand, in a case where the connection request having the predetermined radio field intensity or more is received, a YES determination is made, and a signal requesting a BD address is transmitted in step ST30. In other words, in a case where the portable terminal 3 exists within the printing request reception range R2, a YES determination is made, and a signal requesting a BD address is transmitted in step ST30. The BD address, which is in conformity with the above-mentioned BLE wireless communication standard, is identification information fixedly assigned in advance to be able to uniquely specify an individual of the portable terminal 3. The BD address is an example of terminal information.

Upon receiving a BD address request in step ST35, the portable terminal 3 is configured to return its own BD address to the label printer 2 in step ST40. A packet including the BD address is an example of a second packet. Upon receiving the BD address in step ST45, in step ST50, the label printer 2 is configured to check the received BD address with the above-mentioned connection history table 25b to determine whether the BD address is the BD address of the portable terminal 3 connected in the past. In a case where the received BD address is not recorded in the connection history table 25b, a NO determination is made, and the processing returns to step ST5. On the other hand, in a case where the received BD address is recorded in the connection history table 25b, a YES determination is made, a connection of BLE wireless communication is established with the portable terminal 3 that is a transmission source of the BD address, and the processing proceeds to step ST55. In step ST55, the label printer 2 requests the portable terminal 3 with which the BLE connection is established to transmit the automatic reservation print data.

Upon receiving an automatic reservation print data request in step ST60, the portable terminal 3 is configured to determine, in ST65, whether unprinted data that is not subjected to the printing processing is saved in the mass storage device 35. In a case where the unprinted data is not saved, a NO determination is made, and this sequence is directly ended. On the other hand, in a case where the unprinted data is saved, a YES determination is made, and it is determined, in the following step ST70, whether the saved unprinted data is subjected to automatic printing reservation. In a case where the unprinted data is subjected to the automatic printing reservation, a YES determination is made, and the processing proceeds to step ST85. On the other hand, in a case where the unprinted data is not subjected to the automatic printing reservation, a NO determination is made, and the processing proceeds to step ST75. The unprinted data subjected to the automatic printing reservation is print data saved by operating the automatic printing reservation button 33b on the edit screen of the portable terminal 3 in FIG. 3. In addition, the unprinted data not subjected to the automatic printing reservation is print data saved by operating the save button 33a.

Figure 6:
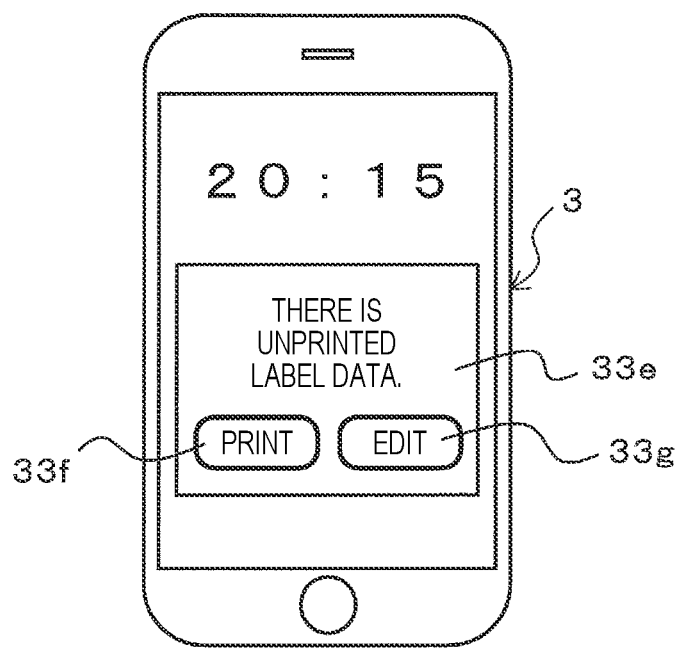
FIG. 6 is a diagram illustrating a case where existence of unprinted data other than automatic printing reservation data is notified in automatic reserved printing.

In step ST75, the portable terminal 3 is configured to display, on the touch panel 33, a pop-up notification 33e indicating that the unprinted data not subjected to the automatic printing reservation is saved. FIG. 6 is a screen example of the pop-up notification 33e. In the pop-up notification 33e, existence of print data that is not the automatic reservation print data is notified, and a print button 33f and an edit button 33g are displayed. The user may press the print button 33f to directly transmit the saved print data to the label printer 2 to print, or may press the edit button 33g to restart editing of the print data at that time.

In the following step ST80, it is determined whether the user has pressed the print button 33f of the pop-up notification 33e. In a case where the print button 33f is pressed, a YES determination is made, and the processing proceeds to step ST85. On the other hand, in a case where the edit button 33g is pressed, a NO determination is made, the automatic transmission program 35b is ended, and the processing proceeds to an editing processing of the print data via the editing program 35a.

In a case where it is determined, in step ST70, that there is automatic printing reservation data, or in a case where it is determined, in step ST80, that the print button 33f is pressed, it is determined, in ST85, whether the medium information associated with the unprinted data to be printed matches the cartridge information included in the advertising packet. The medium information and the cartridge information include the tape width of the medium, a base color of the tape, and a print color. In a case where these three pieces of information are the same, a YES determination is made. In a case where a YES determination is made in step ST85, the processing proceeds to step ST95, and the unprinted data to be printed is transmitted to the label printer 2 together with the medium information. In a case where a NO determination is made in step ST85, in step ST90, a message indicating that the cartridge 101 mounted to the label printer 2 is to be replaced with a cartridge 101 indicated by the medium information associated with the unprinted data to be printed is displayed on the touch panel 33 of the portable terminal 3. Thereafter, the processing proceeds to step ST95.

Upon receiving the print data in step ST100, in step ST105, the label printer 2 is configured to acquire the specification information of the cartridge 101 mounted at that time via the cartridge sensor 23. Next, in step ST110, it is determined whether a content of the acquired cartridge specification information matches the medium information of the received print data. In a case where the content matches the medium information, in step ST120, a YES determination is made, printing is performed based on the print data, and a printing label L is created. Thereafter, in step ST125, the BD address of the portable terminal 3 is stored in the connection history table 25b, and this sequence is ended. On the other hand, in a case where the content of the acquired cartridge specification information does not correspond to the received print data, a NO determination is made, information of cartridge error is transmitted to the portable terminal 3, and this sequence is ended without performing the printing. For example, a cartridge error occurs in a case where the user replaces the cartridge mounted to the label printer 2 during a period from the reception of the advertising packet by the portable terminal 3 to the printing.

Upon receiving the cartridge error information, in ST115, the portable terminal 3 is configured to display a message for prompting replacement of the cartridge 101 mounted in the label printer 2. Then, this sequence is ended. In a case where a cartridge error occurs, the user replaces the cartridge, then executes the editing program of the portable terminal 3, and issues a print instruction again, thereby printing the print data.

The procedure of step ST5 is an example of a packet output processing. The procedure of step ST20 in which the label printer 2 receives the BD address from the portable terminal 3 is an example of a packet acquisition processing. The procedure of step ST50 is an example of an information determination processing. The procedure of step ST55 is an example of a request processing. The procedure of step ST120 is an example of a printing processing. The procedure of step ST110 is an example of a medium determination processing. The processing of saving the print data in the mass storage device 35 by the editing program 35a in the portable terminal 3 is an example of a storage processing. The procedure of ST10 in which the portable terminal 3 receives the advertising packet from the label printer 2 is an example of the packet acquisition processing. The procedure of step ST40 is an example of an information output processing. The procedure of step ST60 in which the automatic reservation print data request is received from the label printer 2 is an example of a request acquisition processing. The procedure of step ST95 is an example of a data output processing. The procedure of step ST75 is an example of a notification processing. The procedure of step ST115 is an example of a display processing.

EFFECTS OF EMBODIMENT

As described above, according to the label printer 2 of the present embodiment, it is possible to request print data from the portable terminal 3 by the label printer 2 itself in the procedure of step ST55 and perform printing based on the acquired print data. For example, in a case where the user returns home after the print data is created in the portable terminal 3 at the visiting destination, by outputting the automatic reservation print data request from the label printer 2 in response to the acquisition of the packet including the BD address from the portable terminal 3 after the advertising packet based on the BLE standard is output, a desired printing label L can be obtained without issuing a print instruction from the portable terminal 3 again.

The portable terminal 3 configured to output the automatic reservation print data to the label printer 2 is limited to a portable terminal 3 of which it is determined, in step ST50, that the BD address is stored in the connection history table 25b, that is, a portable terminal 3 having a wireless connection record with the label printer 2 in the past. According to the present embodiment, it is possible to avoid an automatic print instruction to the label printer 2 not intended by the user at an unintended timing.

Particularly in the present embodiment, the cartridge holder 22 in which the cartridge 101 including the long base tape and the cover film is mounted is further provided. In the procedure of step ST120, the control circuit 21 is configured to convey the base tape and the cover film of the cartridge 101 mounted to the cartridge holder 22 and configured to cause the print head 24 to print the print data acquired from the portable terminal 3. As described above, even in a case where the so-called label printer 2 creates the printing label L as a printed matter, a desired printing label L can be obtained without issuing a print instruction from the portable terminal 3 again. The label printer 2 is not limited to a type using a so-called cassette shaped cartridge having a narrow width, and can be applied to a type using a cartridge having a shape in which a slightly wide tape is wound around a winding core.

Particularly in the present embodiment, in a case where the cartridge 101 of the specification information corresponding to the print data is mounted to the cartridge holder 22, the control circuit 21 is configured to cause the print data to be printed on the base tape of the cartridge 101, in the procedure of step ST120. As a result, printing can be automatically performed on the cartridge 101 of the specification information corresponding to the print data stored in the portable terminal 3.

Particularly in the present embodiment, the control circuit 21 is further configured to execute the procedure of step ST110 of determining whether the cartridge 101 of the specification information corresponding to the print data is mounted to the cartridge holder 22, and in a case where it is determined that the cartridge 101 of the specification information corresponding to the print data is mounted, the control circuit 21 is configured to cause the print data to be printed on the base tape of the cartridge 101, in the procedure of step ST120. As a result, only in a case where the mounted cartridge 101 corresponds to the print data, the print data acquired from the portable terminal 3 can be automatically printed.

Particularly in the present embodiment, the specification information of the cartridge 101 mounted to the label printer 2 is received together with the advertising packet, and whether the specification information of the cartridge 101 corresponds to the print data is determined at a portable terminal 3 side, in the procedure of step ST85. That is, the control circuit 21 of the label printer 2 is configured to transmit, to the portable terminal 3, the cartridge specification information related to the cartridge 101 mounted to the cartridge holder 22 together with the advertising packet. In this case, the print data corresponding to the cartridge 101 mounted to the label printer 2 itself can be acquired from the portable terminal 3 and automatically printed.

In the present embodiment, subsequently, in the procedure of step ST110, the control circuit 21 of the label printer 2 is further configured to determine whether the specification information of the cartridge 101 mounted in the cartridge holder 22 corresponds to the print data. As a result, it is possible to avoid an error processing and automatic printing on a different medium even in a case where the cartridge is changed after the advertising packet is received.

In the procedure of step ST5, the control circuit 21 is configured to periodically output an advertising packet including the cartridge specification information. As a result, it is possible to reduce a communication load with the portable terminal 3 as compared with a case where the cartridge specification information is transmitted to the portable terminal 3 separately from the advertising packet.

Particularly in the present embodiment, the CPU 31 of the portable terminal 3 is configured to output the print data stored in the mass storage device 35 in response to a print data request from the label printer 2, and thus the label printer 2 can perform printing based on the acquired print data. For example, in a case where the user returns home after the print data is created by an operation at the visiting destination, by acquiring a print request in response to the acquisition of the advertising packet from the label printer 2 based on the BLE standard, and by outputting the stored print data, a desired printing label L can be obtained by performing printing using the label printer 2.

By outputting the BD address of the portable terminal 3 based on the acquisition of the advertising packet, it is possible to output the print data based on the print data request only in a case where the BD address satisfies a predetermined condition, for example, only in a case where the BD address is the BD address of the portable terminal 3 having a wireless connection record with the label printer 2 in the past.

Particularly in the present embodiment, in a case where the print data is saved by the editing program 35a, the CPU 31 is configured to cause the mass storage device 35 to store the created print data as the automatic reservation print data, and configured to output, in the procedure of ST95, the print data corresponding to the print data request in a case where there is print data stored as the automatic reservation print data in the mass storage device 35.

As a result, while the print data stored in the mass storage device 35 as the automatic reservation print data can be automatically printed in the label printer 2, it is possible to avoid inadvertently printing data created for other purposes, such as data temporarily saved during creation.

Particularly in the present embodiment, in a case where there is no print data stored as the automatic reservation print data in the mass storage device 35 and the print data that is not the reservation print data is stored in the mass storage device 35, the CPU 31 is configured to perform the procedure of step ST75 of displaying, on the touch panel 33 of the portable terminal 3, the existence of the unprinted data that is not the automatic reservation print data by the pop-up notification 33e. As a result, it is possible to cause the user to recognize that unprinted data other than the automatic reservation print data, such as data temporarily saved during creation, is stored in the mass storage device 35, and to prevent the user from forgetting to print.

In addition, the cartridge specification information included in the received advertising packet is stored, and in a case where the print data is to be transmitted, the automatic reservation print data is transmitted only in a case where the automatic reservation print data corresponds to the medium information of the print data. As a result, correspondence can be made at the portable terminal 3 side to avoid that the cartridge 101 mounted to the label printer 2 and the print data stored in the mass storage device 35 do not match with each other and a print error occurs.

Particularly in the present embodiment, in a case where the specification information of the cartridge 101 does not correspond to the print data stored in the mass storage device 35, the CPU 31 is configured to perform the procedure of step ST115 of displaying, on the touch panel 33, the message for prompting replacement of the cartridge 101 by the pop-up notification 33e. As a result, in a case where the cartridge 101 mounted in the label printer 2 does not match the print data stored in the mass storage device 35, the user can be prompted to replace the cartridge 101.

The sequence charts illustrated in FIGS. 4A, 4B, and 5 do not limit the present invention to the procedures shown in the above sequences, and addition or deletion of the procedures, change of an order thereof, or the like may be made within a range not departing from a gist and a technical idea of the present invention.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the label printer 2 determines whether the portable terminal 3 exists within the printing request reception range R2 based on the radio field intensity of the connection request, but the portable terminal 3 may perform the determination. For example, the portable terminal 3 determines whether a distance from the label printer 2 is within the printing request reception range R2, based on the radio field intensity of the received advertising packet. In a case where it is determined that the distance is within the printing request reception range R2, a connection request that is a response packet may be transmitted. In addition, the portable terminal 3 may include its own BD address in the response packet of the advertising packet. In this case, the processing of step ST30 to step ST45 are unnecessary. Before the automatic reservation print data request is received from the label printer 2, for example, in a case where the advertising packet is received, the portable terminal 3 may be configured to determine whether there is automatic printing reservation data, and may be configured to transmit its own BD address to the label printer 2 only in a case where there is automatic printing reservation data and the cartridge information included in the advertising packet corresponds to the medium information of the automatic printing reservation data.

The label printer 2 may be configured to transmit the cartridge information to the portable terminal 3 at another timing instead of transmitting the cartridge information included in the advertising packet. For example, the cartridge information may be transmitted in a case where the BD address is requested, or in a case where the automatic printing reservation data is requested. The label printer 2 may be configured not to transmit the cartridge information to the portable terminal 3. It may be determined whether the medium information of the print data received from the portable terminal 3 corresponds to the mounted cartridge information.

The portable terminal 3 is configured to store the editing program 35*a* and the automatic printing program 25*a*, but the invention is not limited thereto, and the editing processing and an automatic printing processing may be performed by a single program. In addition, the editing program 35*a* may include a print button instead of the automatic printing reservation button 33*b*. In a case where the print button is operated, a list of all the printers (printers in communication) currently connectable at that time may be displayed on the touch panel 33. In a case where not a single printer name is displayed in the printer list, or in a case where the user cannot find a printer name desired to be a print destination from the list (in a case of a visiting destination), a predetermined operation may be performed to store data as the automatic reservation print data, in the same manner as in a case where the automatic printing reservation button 33*b* of the portable terminal 3 of the present embodiment is pressed.

Although not exemplified one by one, the present invention can be implemented with various modifications within a range not departing from the gist thereof

What is claimed is:

1. A printer comprising:
a wireless communication controller;
a memory configured to store first terminal information, the first terminal information being identification information for specifying a first information terminal, wherein the first information terminal wirelessly connected to the printer via the wireless communication controller based on a Bluetooth Low Energy standard;
a printing unit; and
a controller configured to perform:
packet output processing of periodically outputting a first packet based on the Bluetooth Low Energy standard via the wireless communication controller;
packet acquisition processing of acquiring a second packet via the wireless communication controller, the second packet including second terminal information of a second information terminal that receives the first packet, the second terminal information being identification information for specifying the second information terminal;
information determination processing of determining whether the second terminal information included in the second packet is the first terminal information stored in the memory, the second packet being acquired in the packet acquisition processing;
request processing of not making a request for print data in a case where it is determined, in the information determination processing, that the second terminal information included in the second packet is not the first terminal information stored in the memory, and of making a request for the print data from the second information terminal via the wireless communication controller in a case where it is determined, in the information determination processing, that the second terminal information included in the second packet is the first terminal information stored in the memory; and
printing processing of causing the printing unit to print the print data obtained from the second information terminal in response to the request, without receiving a print instruction, the print data being acquired via the wireless communication controller.

2. The printer according to claim 1, further comprising:
a cartridge holder configured to accept a medium cartridge including a printing medium,
wherein, in the printing processing, the controller is configured to cause the printing unit to:
convey the printing medium of the medium cartridge accepted in the cartridge holder; and
print the print data acquired from the second information terminal.

3. The printer according to claim 2,
wherein, in a case where the medium cartridge is accepted in the cartridge holder, the accepted medium cartridge including the printing medium having a medium type corresponding to the print data, the controller is configured to cause, in the printing processing, the printing unit to print the print data on the printing medium.

4. The printer according to claim 3,
wherein the controller is further configured to:
perform medium determination processing of determining whether the medium cartridge is accepted in the cartridge holder, the medium cartridge including the printing medium having the medium type corresponding to the print data; and cause, in the printing processing, the printing unit to print the print data on the printing medium, in a case where it is determined, in the medium determination processing, that the medium cartridge is accepted, the accepted medium cartridge including the printing medium having the medium type corresponding to the print data.

5. The printer according to claim 3,
wherein the controller is configured to transmit cartridge information to the second information terminal, the cartridge information being related to the medium cartridge accepted in the cartridge holder.

6. The printer according to claim 5,
wherein, in the packet output processing, the controller is configured to periodically output the first packet including the cartridge information.

7. A non-transitory computer readable storage medium storing an information processing program used in an information terminal, the information terminal including a computing part, an operation unit, a memory, a wireless communication controller, and a display unit, the information terminal being configured to control a printer, the information processing program comprising instructions which, when executed by the computing part, cause the computing part to perform:
storage processing of storing print data in the memory, the print data being created based on an operation via the operation unit;
packet acquisition processing of acquiring a packet based on a Bluetooth Low Energy standard from the printer via the wireless communication controller;
information output processing of outputting terminal information of the information terminal via the wireless communication controller, according to the packet acquired in the packet acquisition processing;
request acquisition processing of acquiring a print data request from the printer via the wireless communication controller; and
data output processing of outputting the print data stored in the memory via the wireless communication controller, in a case where the print data is stored in the memory,
wherein the computing part is configured to:
cause, in the storage processing, the memory to store the print data created based on the operation via the operation unit, the print data being reservation print data; and
output, in the data output processing, the reservation print data according to the print data request, in a case where the memory stores the reservation print data.

8. The non-transitory computer readable storage medium according to claim 7,
wherein the computing part is further configured to perform notification processing of causing the display unit to notify existence of the print data that is not the reservation print data, in a case where the memory does not store the reservation print data and the memory stores print data that is not the reservation print data.

9. The non-transitory computer readable storage medium according to claim 7,
wherein the computing part is further configured to:
perform information acquisition processing of acquiring medium information describing a medium cartridge mounted on the printer; and
output, in the data output processing, the print data, in a case where the medium information acquired in the information acquisition processing corresponds to the print data stored in the memory.

10. The non-transitory computer readable storage medium according to claim 9,
wherein the computing part is further configured to perform display processing of causing the display unit to display a message for prompting replacement of the medium cartridge, in a case where the medium information acquired in the information acquisition processing does not correspond to the print data stored in the memory.

11. A printer comprising:
a wireless communication controller;
a memory configured to store first terminal information, the first terminal information being identification information for specifying a first information terminal, wherein the first information terminal wirelessly connected to the printer via the wireless communication controller based on a Bluetooth Low Energy standard;
a printing unit; and
a controller configured to perform:
packet output processing of periodically outputting a first packet based on the Bluetooth Low Energy standard via the wireless communication controller;
packet acquisition processing of acquiring a second packet via the wireless communication controller, the second packet including second terminal information of a second information terminal that receives the first packet, the second terminal information being identification information for specifying the second information terminal;
information determination processing of determining whether the second terminal information included in the second packet is the first terminal information stored in the memory, the second packet being acquired in the packet acquisition processing;
request processing of not making a request for print data in a case where it is determined, in the information determination processing, that the second terminal information included in the second packet is not the first terminal information stored in the memory, and of making a request for the print data from the second information terminal via the wireless communication controller in a case where it is determined, in the information determination processing, that the second terminal information included in the second packet is the first terminal information stored in the memory; and
printing processing of causing the printing unit to print the print data obtained from the second information terminal in response to the request, the print data being acquired via the wireless communication controller,
the printer further comprising a cartridge holder configured to accept a medium cartridge including a printing medium,
wherein, in the printing processing, the controller is configured to cause the printing unit to:
convey the printing medium of the medium cartridge accepted in the cartridge holder; and
print the print data acquired from the second information terminal,
wherein, in a case where the medium cartridge is accepted in the cartridge holder, the accepted medium cartridge including the printing medium having a medium type corresponding to the print data, the controller is configured to cause, in the printing processing, the printing unit to print the print data on the printing medium, wherein the controller is further configured to:
  perform medium determination processing of determining whether the medium cartridge is accepted in the cartridge holder, the medium cartridge including the printing medium having the medium type corresponding to the print data; and
  cause, in the printing processing, the printing unit to print the print data on the printing medium, in a case where it is determined, in the medium determination processing, that the medium cartridge is accepted, the accepted medium cartridge including the printing medium having the medium type corresponding to the print data.

* * * * *